United States Patent [19]

Gustafson et al.

[11] Patent Number: 4,789,304

[45] Date of Patent: Dec. 6, 1988

[54] INSULATED PROPELLER BLADE

[75] Inventors: Robert Gustafson, Windsor; David P. Nagle, Windsor Locks, both of Conn.

[73] Assignee: United Technologies Corporation, Hartford, Conn.

[21] Appl. No.: 92,501

[22] Filed: Sep. 3, 1987

[51] Int. Cl.$^4$ .............................................. B64C 11/26
[52] U.S. Cl. ..................................... 416/95; 416/224; 416/226; 416/230
[58] Field of Search ................... 416/171, 224, 229 R, 416/95, 230, 241, 226

[56] References Cited

U.S. PATENT DOCUMENTS

| | | | |
|---|---|---|---|
| 2,526,409 | 10/1950 | Price | 416/171 X |
| 3,176,775 | 4/1975 | Clemens | 416/226 X |
| 3,647,317 | 3/1972 | Furlong et al. | 416/226 |
| 4,037,751 | 7/1977 | Miller et al. | 416/229 R X |
| 4,108,572 | 8/1978 | Platt | 416/230 |
| 4,268,571 | 5/1981 | McCarthy | 416/229 R X |
| 4,488,399 | 12/1984 | Robey et al. | 416/171 X |
| 4,522,673 | 6/1985 | Fell et al. | 416/230 X |
| 4,524,499 | 6/1985 | Grimes et al. | 416/230 X |
| 4,648,921 | 3/1987 | Nutter | 416/226 X |
| 4,685,864 | 8/1987 | Angus et al. | 416/229 R |

FOREIGN PATENT DOCUMENTS

| | | | |
|---|---|---|---|
| 2165264 | 8/1973 | France | 416/224 |
| 601170 | 4/1948 | United Kingdom | 416/171 |
| 831380 | 3/1960 | United Kingdom | 416/224 |

Primary Examiner—Everette A. Powell, Jr.
Attorney, Agent, or Firm—Lloyd D. Doigan

[57] ABSTRACT

A propeller blade is insulated to withstand the high temperature exhaust of a gas turbine engine. The blade has a spar, a skin covering the spar and forming a contour of the blade, and an insulating layer disposed between the spar and the skin along the portion of the blade operating within the high temperature exhaust of an engine.

7 Claims, 2 Drawing Sheets

INSULATED PROPELLER BLADE

DESCRIPTION

1. Technical Field

This invention relates to propeller blades and more particularly to propeller blades which withstand the temperature of the exhaust of a gas turbine engine.

2. Background Art

Some aircraft propulsion systems include a gas turbine engine, a gearbox and a plurality of propeller blades. The blades are driven by the engine through the gearbox. Pusher-type propulsion systems mount the propeller blades aft of the engine. As it is preferable to direct the exhaust stream of the engine straight back from the engine to utilize the propulsive energy of the exhaust stream, the blades may be disposed within the exhaust stream.

In British Patent specification No. 601,170 to Smith, the propellers are protected from the heat of the exhaust stream by directing the exhaust stream around the propellers. Smith also shows a plurality of nozzles arranged angularly about in engine nacelle. The nozzles disperse the hot gases of the exhaust stream along a significant length of each blade so that the hot gases mix with the ambient air to lower the exhaust stream temperature. Smith avoids directing a concentrated exhaust stream against a small area of the blades. The nozzles shown by Smith, however, create excessive drag, noise and weight.

DISCLOSURE OF INVENTION

It is an object of the invention to protect a blade from the hot exhaust gases of a gas turbine engine without excessive drag, noise, or weight.

According to the invention, a propeller blade is insulated to withstand the high temperature exhaust of a gas turbine engine. The blade has a spar, a skin covering the spar and forming a contour of the blade, and an insulating layer disposed between the spar and the skin along the portion of the blade operating within the high temperature exhaust of an engine.

By insulating the blade, more drag resistant, quieter and lighter nozzles may be used. Also, the insulated blades may be placed closer to the nozzles thereby shortening the entire propulsion system.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
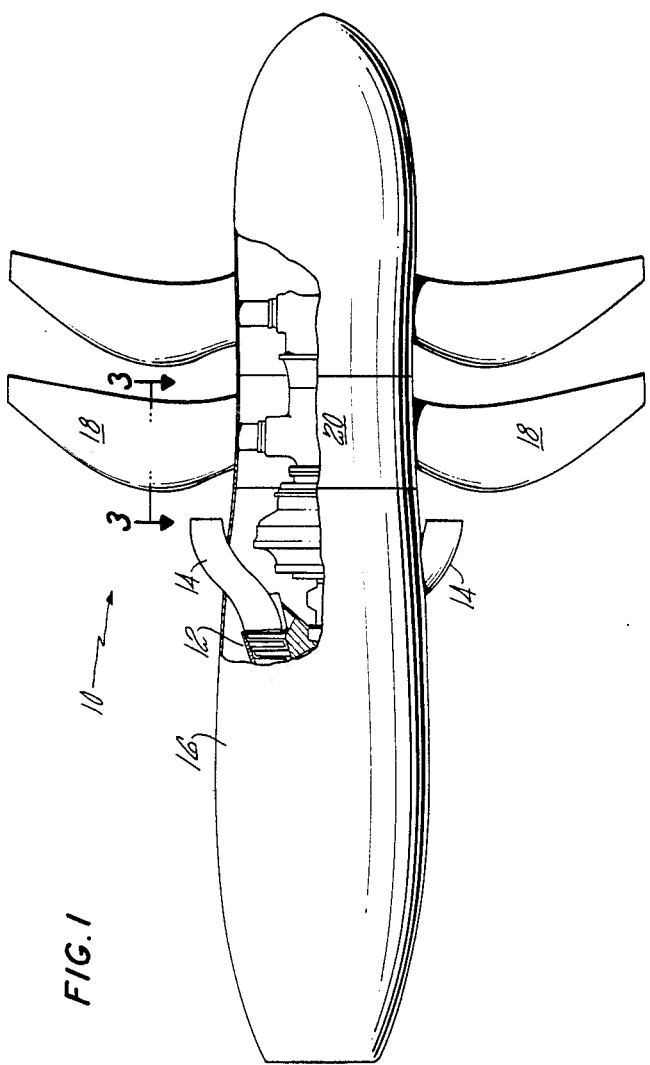
FIG. 1 is a schematic view, partly broken away, of a counter-rotating propulsion system which utilize an embodiment of the invention.

Referring to FIG. 1, a pusher type counter-rotating propulsion system 10 is shown. The exhaust stream of a gas turbine engine 12 is collected by a plurality of nozzles 14 which are symmetrically spaced about a nacelle 16. The nozzles have a low profile and are aerodynamically shaped to minimize noise, drag and weight. The nozzles direct the exhaust stream straight back from the engine so that the propulsive energy within the stream is utilized.

A row of propeller blades 18 which are generally disposed about twenty inches behind the nozzles extend about fifty-two inches from the spinner 20. A longitudinal portion of each of the blades is disposed directly within the exhaust stream of the engine as each blade rotates. Typically the exhaust stream exits the nozzles at about 1200° F. Because the blades rotate through the hot exhaust and the relatively cool ambient air between the nozzles, the average temperature the blades experience is about 500° F. The 500° F. is a higher temperature than aluminum spar blades can tolerate.

Figure 3:
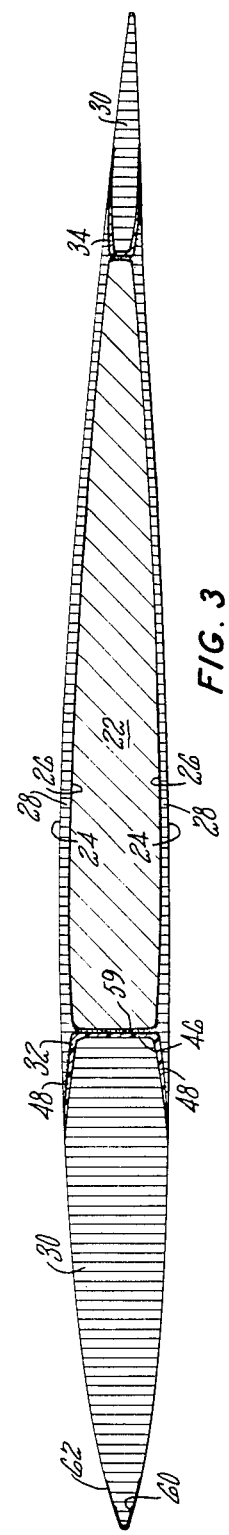
FIG. 3 is a cross-sectional view taken along the line 3—3 of FIG. 1.
Figure 2:
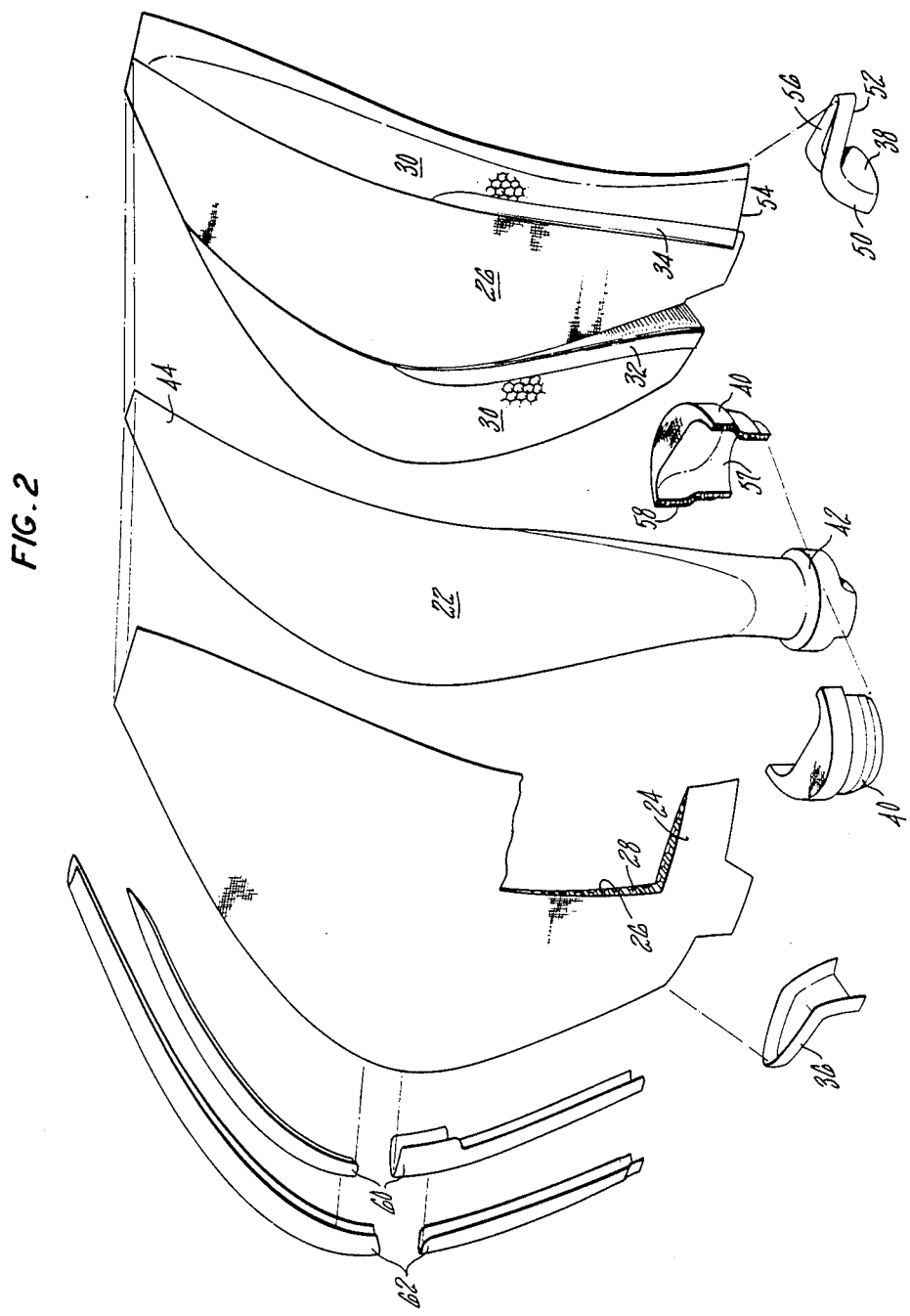
FIG. 2 is an exploded perspective view, partly broken away of a blade of FIG. 1.

Referring to FIGS. 2 and 3, an embodiment of the propeller blade 18 of the invention is shown. The blade comprises a spar 22, an outer skin 24, an inner skin 26, an insulating material 28 disposed between the inner skin and the outer skin to protect the spar, fill material 30 disposed within the outer skin for structural reinforcement, a leading edge filler cap 32 and a trailing edge filler cap 34 for adhering the fill material to the spar, a leading edge shell closure 36, a trailing edge shell closure 38, and an insulated collar 40.

The spar 22 is constructed of aluminum having a contour that approximates the finished contour of the blade. The root portion 42 of the spar is contoured to be held by bearings, as is well known in the art. The spar tapers along its length from a circular contour near the root portion (or inboard portion) to a flattened blade-like contour at its outboard portion 4.

The outer skin consists of two halves, a pressure half and a suction half. Each half is contoured aerodynamically to the finished shape of the blade. The inner and outer skins are constructed of a fiberglass polyimide resin.

A portion of the spar within the exhaust stream of the jet engine is protected by the insulating material 28 which is preferably a dead air insulator. Typically, the dead air insulator will be a honeycomb formed of a fiberglass polyimide resin. The cells of the honeycomb may be filled with a mixture of Tech-pril and polyimide resin foam to provide structural integrity to the honeycomb.

The insulating material 28 is enclosed about the area of the outer shell 24 which corresponds to the portion of the spar 22 that will be in the exhaust stream by the inner skin 26. The inner skin is constructed of the same fiberglass polyimide resin as the outer skin. The insulating material typically will extend from the beginning of the tapered portion of the spar up the length of the blade depending on the length of the blade disposed within the exhaust stream of the engine.

Portions between the pressure half and suction half outer skin 24, not surrounding the spar, are reinforced with a fill material 30 such as a polyimide resin honeycomb to provide structural integrity to the blade. The leading edge filler cap 32 and the trailing edge filler cap 38 ar attached to the honeycomb fill so that the honeycomb may be easily bonded to the spar. Each filler cap has a u-shaped cross-section having a base 46 and two arms 48 (see FIG. 3). The arms and base embrace the honeycomb. The base attaches to the spar. The filler caps also provide some structural integrity to the honeycomb.

The leading edge shell closure 36 and the trailing edge shell closure 38 which conform to the shape of the bottom edge of the blade are placed at the bottom edge of the blade to protect the fill material 30 from the environment. Each shell closure (see FIG. 2) has a collar portion 50 for engaging the root portion 42 of the spar, an extending base 52 portion for engaging the bottom edge portion 54 of the blade 18, and an upwardly extending portion 56 extending from the bottom edge portion for engaging the outer shell 24.

The two-piece collar 40 has a skin 57 enclosing fiberglass polyimide honeycomb material 58 to insulate the root portion 40 of the spar. The collar is disposed about the root portion of the spar and the leading and trailing edge shell closures thereby protecting the root blade from the temperature of the exhaust stream.

To construct the blade, the pressure and suction sides of the outer shell are cured. The honeycomb is bonded to the outer shell by an adhesive such as FM35-1 TM. (Manufactured by the American Cyanimid Co, Wayne N. J.). The cells of the honeycomb are filled with a mixture of Tech-pril TM (a fiberglass polyimide foam manufactured by Filtec Ltd., England) and polyimide resin. The inner shell is then laid in over the honeycomb. The leading edge filler cap is bonded to the leading edge honeycomb and the trailing edge filler cap is bonded to the trailing edge honeycomb by means of the same FM35-1 film adhesive. The filler caps and honeycomb are then bonded to one side of the outer skin using an adhesive such as FM35-1.

The side of the outer skin bonded to the filler caps and honeycomb is laid within a mold (not shown) and the spar is laid in over that side. The other side of the skin is laid on top of the spar. Shims (not shown) are provided between the parts to provide the proper spacing between the sections. The blade is then cured. A fifty-fifty mixture 59 of adhesives RTV 630 TM and RTV 615 TM (manufactured by the General Electric Company, Polymers Products Department, Pittsfield, MA) is injected between the spar and skin and between the spar and filler caps to join the spar 22, inner skin 26 and filler caps 32, 34 together (see FIG. 3). This adhesive mixture has a compatible thermal coefficient of expansion so that temperature gradients between the spar, inner skin and filler caps will not cause the spar, inner skin and filler caps to separate. Inboard leading edge wraps 60, outboard leading edge wraps 62, leading and trailing edge closures 36, 38 and the insulated collar 40 are applied and the blade is finally cured.

The thickness of the insulating honeycomb depends on the aerodynamic specifications required of the blade and the amount of insulation to be provided. In the embodiment shown, the thickness of the honeycomb is about six centimeters. Such insulation will keep the aluminum spar blade below 260° F. so that the possibility of the spar failing due to heat fatigue is minimized.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A propeller blade having an exterior portion operating within a high temperature exhaust stream of an engine, said blade characterized by:
   a spar approximating a contour of said blade,
   an outer first skin covering said spar and forming a contour of said blade, and
   insulating means disposed between said spar and said first skin along said portion for protecting said spar from said temperature of said exhaust stream such that the temperature of said spar does not exceed 260° F.

2. The blade of claim 1 wherein said insulating means is characterized by
   an open celled matrix said cells of said matrix trapping insulating air.

3. The blade of claim 2 wherein said cells of said matrix are injected with foam which traps insulating air and provides structural integrity to said honeycomb.

4. The blade of claim 1 wherein said blade is further characterized by a second skin disposed between said spar and said insulating means said second skin entrapping said insulating means between said first and second skins.

5. The blade of claim 4 further characterized by adhesive means for bonding said second skin to said spar said adhesive means allowing for different coefficients of expansion of said spar and said second skin such that separation between said second skin and said spar is improbable.

6. The blade of claim 1, further characterized by collar means disposed about a root portion of said spar for insulating said root portion.

7. The blade of claim 1, wherein said skin and said insulating means comprise fiberglass polyimide resin.

* * * * *